United States Patent [19]

Okumura et al.

[11] Patent Number: 4,895,677

[45] Date of Patent: Jan. 23, 1990

[54] LIGHT-POLARIZING FILM

[75] Inventors: Takuzo Okumura, Tokyo; Toyokazu Okada; Hitoshi Kikui, both of Osaka, all of Japan

[73] Assignee: Sumitomo Chemical Company, Limited, Osaka, Japan

[21] Appl. No.: 262,571

[22] Filed: Oct. 25, 1988

Related U.S. Application Data

[62] Division of Ser. No. 910,220, filed as PCT JP86/00091 on Feb. 25, 1986, published as WO86/04998 on Aug. 28, 1986, Pat. No. 4,803,014.

[30] Foreign Application Priority Data

Feb. 26, 1985 [JP] Japan .................. 60-36855

[51] Int. Cl.$^4$ .................. F21V 9/14; G02B 5/30
[52] U.S. Cl. .................. 252/585; 350/397; 428/476.9; 428/483; 428/516; 428/520; 428/411.1
[58] Field of Search .................. 252/585; 350/397; 428/476.9, 483, 516, 520, 411.1

[56] References Cited

U.S. PATENT DOCUMENTS

| | | | |
|---|---|---|---|
| 2,173,304 | 9/1939 | Land | 252/585 |
| 2,220,111 | 11/1940 | Marks | 252/585 |
| 2,237,567 | 4/1941 | Land | 350/397 |
| 3,884,693 | 5/1975 | Bauer | 96/15 |
| 4,133,775 | 1/1979 | Bloom | 252/585 |
| 4,256,493 | 3/1981 | Yokoyama | 106/22 |
| 4,264,692 | 4/1981 | Held | 430/17 |
| 4,279,653 | 7/1981 | Makishima | 106/22 |
| 4,387,133 | 6/1983 | Ichikawa | 428/522 |
| 4,396,646 | 8/1983 | Schuler | 427/163 |
| 4,465,767 | 8/1984 | Oba | 430/271 |
| 4,466,704 | 8/1984 | Schuler | 350/398 |

OTHER PUBLICATIONS

Patent Abstracts of Japan, vol. 9, No. 33 (P-334)(1756), Feb. 1985.

*Primary Examiner*—Teddy S. Gron
*Assistant Examiner*—Richard Treanor
*Attorney, Agent, or Firm*—Stevens, Davis, Miller & Mosher

[57] ABSTRACT

The present invention relates to a high-performance light-polarizing film assuming a neutral gray wherein are adsorbed and oriented, in a polymer film, (A) iodine as a main polarizing coloring matter and additionally (B) a dichroism dye having a absorption characteristics and polarization characteristics in the low wavelength region of visible light and showing, when adsorbed and oriented together with iodine in a polymer film, a direction of transition moment substantically identical with that of iodine and/or a dichroism dye having absorption characteristics and polarization characteristics in the high wavelength region of visible light and showing, when adsorbed and oriented together with iodine in a polymer film, a direction of transition moment substantially identical with that of iodine. As compared with the prior iodine type light-polarizing films, the light-polarizing film obtained in the above-mentioned manner has a high light transmittance in the wavelength range of visible light, assumes a neutral gray and has a high polarizing co-efficient. Accordingly, it is effectively usable as a liquid crystal material for liquid crystal television and the like and effectively applicable to optical uses such as CRT filter and the like.

1 Claim, No Drawings

LIGHT-POLARIZING FILM

This is a division of application Ser. No. 910,220, filed as PCT JP 86/00091 on Feb. 25, 1986, published as WO86/04998 on Aug. 28, 1986, now U.S. Pat. No. 4,803,014.

TECHNICAL FIELD

The present invention relates to a high-performance light-polarizing film having a neutral gray in which iodine and a dichroism dye are used as polarizing coloring matter.

BACKGROUND OF THE INVENTION

At the present time, light-polarizing films are usually produced by the absorption of polarizing coloring matter, such as iodine or dichroism dye, into a stretched and oriented film made of polyvinyl alcohol or its derivative or into an oriented polyene film prepared by dehydrochlorinating a polyvinyl chloride film or dehydrating a polyvinyl alcohol film to form a polyene film and then orienting the polyene film.

As for the performances of light-polarizing film, light-polarizing films having a high light-transmittance of single polarizer and a high polarizing co-efficient and showing a uniform light transmittance of single polarizer and a uniform polarizing co-efficient over the whole wavelength range of visible light, i.e. 400 nm to 700 nm, are desirable.

Among the light-polarizing films, those in which iodine is used as polarizing coloring matter show a uniform light transmittance (this means that the film assumes a neutral gray) over the whole wavelength range of visible light, i.e. 400 nm to 700 nm, and show a relatively uniform and high polarizing co-efficient, when the degree of dyeing is high, i.e. when light transmittance of single polarizer is low. However, when the degree of dyeing is low, i.e. when the light transmittance of single polarizer is high, the light transmittance cannot be uniform (in other words, neutral gray cannot be assumed) over the whole wavelength range of visible light (400 nm to 700 nm) and the polarizing co-efficient is low and dependent on wavelength. In this case, the absorption characteristics and polarization characteristics are particularly bad in the low wavelength region (400-500 nm) and high wavelength region (600-700 nm). Thus, in this case, light transmittance of single polarizer is higher and polarizing co-efficient is lower in said low and high wavelength regions than in other wavelength regions.

On the other hand, light-polarizing films in which a dichroism dye is used as polarizing coloring matter can show no constant light transmittance over the whole wavelength range of visible light (400–700 nm) and their polarizing co-efficient is irregular and dependent on wavelength, regardless of the degree of dyeing.

DISCLOSURE OF THE INVENTION

In view of the above-mentioned state of things, the present inventors conducted elaborated studies to find that a high-performance light-polarizing film assuming a neutral gray can be obtained by using a mixture of iodine and a dichroism dye as polarizing coloring matter and absorbing in and orienting the polarizing coloring matter in a polymer film. Based on this finding, the present invention was accomplished.

Thus, the present invention relates to a high-performance light-polarizing film having a neutral gray produced by absorbing in and orienting iodine and specified organic direct dye, either separately or in the form of a mixture, as polarizing coloring matter in a hydrophilic polymer film, wherein said specified organic direct dye is composed of an organic direct dye which shows absorption characteristics and polarization characteristics in the low wavelength region in the whole wavelength range of visible light (400 nm to 700 nm), and shows, when absorbed in and oriented in a polymer film, a direction of transition moment substantially identical with that of iodine and/or an organic direct dye which shows absorption characteristics and polarization characteristics in the high wavelength region in the whole wavelength range of visible light and shows, when absorbed in and oriented in a polymer film together with iodine, a direction of transition moment substantially identical with that of iodine. The object of the present invention consists in providing a high-performance light-polarizing film assuming a neutral gray and having a high light-transmittance of single polarizer and a high polarizing co-efficient in the wavelength range of visible light, i.e. in the wavelength range of 400 nm to 700 nm.

As the organic direct dye used in the invention, those having a high dichroism ratio, showing absorption characteristics and polarization characteristics in the low or high wavelength region in the whole wavelength range of visible light (400 nm to 700 nm), showing a direction of transition moment substantially identical with that of iodine when absorbed in and oriented in a polymer film together with iodine and showing no polarization characteristics nor absorption characteristics as possible in other wavelength regions are desirable. Although the organic direct dye used in the invention may be selected from any of the organic direct dyes so far as they have the above-mentioned performances, it is usually selected from azo dyes.

As expressed by C.I. Generic Name and trade name, the organic direct dyes having absorption characteristics and polarization characteristics in the low wavelength region which are usable in the invention include the followings:

C.I. Direct Yellow 12 (Chrysophenine),
C.I. Direct Brown 223 (Direct Brown MA),
C.I. Direct Yellow 44 (Direct Fast Yellow GC),
C.I. Direct Yellow 29 (Sumilight Supra Yellow BC),
C.I. Direct Brown 106 (Sumilight Supra Brown G),
C.I. Direct Yellow 142 (Sumilight Yellow GR),
C.I. Direct Orange 26 (Direct Fast Orange S),
C.I. Direct Orange 107 (Sumilight Supra Orange GD),
and the like. Among them, yellow-colored dichroism dyes are useful in the invention, because they have absorption characteristics and polarization characteristics in the lowest wavelength region. Among the yellow-colored dichroism dyes, C.I. Direct Yellow 12 is particularly useful in the invention.

On the other hand, as the organic direct dye having absorption characteristics and polarization characteristics in the high wavelength region, the followings can be referred to:

C.I. Direct Blue 202 (Sumilight Supra Blue 3GS),
C.I. Direct Blue 1 (Direct Sky Blue 6B),
C.I. Direct Blue 168 (Direct Copper Blue 2B),
C.I. Direct Blue 71 (Sumilight Blue BRR),
C.I. Direct Blue 78 (Sumilight Supra Blue G), and the like. Among them, C.I. Direct Blue 202 is particularly useful in the invention, because it has absorption characteristics and polarization characteristics in the highest wavelength region.

By appropriately selecting one or more organic direct dye(s) from the above-mentioned ones and using it (them) together with iodine, a high-performance light-polarizing film having a neutral gray, a high light-transmittance of single polarizer and a high polarizing co-efficient can be obtained. Although it is also effective to use one dye exhibiting its effect only in low wavelength region or only in high wavelength region, the use of a mixture consisting of a dye exhibiting its effect in the low wavelength region and a dye exhibiting its effect in the high wavelength region is more desirable from the viewpoint of obtaining a light-polarizing film having a neutral gray, having a high light-transmittance of single polarizer, showing as small a difference between maximum and minimum polarizing co-efficient as 10% or below and having a high polarizing co-efficient.

More concretely saying, preferable examples of the combination of iodine and dye suitable for the invention include the following: iodine and C.I. Direct Yellow 12; iodine and C.I. Direct Blue 202; iodine and C.I. Direct Yellow 12 and C.I. Direct Blue 202; iodine and C.I. Direct Yellow 29 and C.I. Direct Blue 1; etc.

The polymer films usable in the invention include the films made of polyvinyl alcohol, its derivatives, modified polymers prepared by modifying the above-mentioned polymers with olefins (e.g. ethylene, propylene and the like), crotonic acid, acrylic acid, methacrylic acid, maleic acid and the like, as well as films made of EVA resin (ethylene-vinyl acetate resin), saponified EVA resin, nylon resin, polyester resin and the like. Among them, films made of polyvinyl alcohol and its derivatives are particularly useful in the invention, because dyes can easily be absorbed in and oriented in these polymer films.

As the method for absorbing and orienting iodine and organic direct dye(s) in a polymer film, a method which comprises dissolving iodine and the organic direct dye(s) into water and dyeing a polymer film with the solution is generally employable in the invention. Said method is not limited to a method which comprises dissolving iodine and the organic direct dye(s) simultaneously and dyeing the polymer film with the solution at once, but it may also include a method which comprises dyeing the polymer film first with iodine and subsequently with organic direct dye or a method which comprises first dyeing polymer film with organic direct dye and subsequently with iodine. The orientation of iodine and dichroism dye absorbed in polymer film can be practiced by orienting the polymer film either before the absorption or after it. As the method for stretching the film made of polyvinyl alcohol or its derivatives, any of wet method, a method which comprises carrying out a compressive stretching in dry method and a method which comprises carrying out a tensile stretching in dry method may be employed.

If necessary, a higher effect can be achieved by practicing a post-treatment using boric acid or the like after the absorption and orientation of iodine and organic direct dye in polymer film. By the boric acid treatment, light transmittance and polarizing co-efficient of the light-polarizing film can be improved. Although the conditions of the boric acid treatment vary depending on the kind of polymer film and the kind of organic direct dye used, the concentration of boric acid is usually in the range of 1 to 15% and preferably 5 to 10%, and the temperature of the treatment is usually in the range of 30° to 80° C. and preferably 50° to 75° C. If concentration of boric acid is lower than 1% or temperature is lower than 30° C., the effect of the treatment is small. If concentration of boric acid is higher than 15% or temperature of treatment is higher than 80° C., the formed light-polarizing film is too brittle. If desired, a fixing treatment using an aqueous solution of a cationic polymer may additionally be carried out in combination with the boric acid treatment.

The light-polarizing film thus obtained is made into a light-polarizing plate by laminating a protective film excellent in optically transparent feeling and mechanical strength on its one side or both sides.

The material constituting the protective film is not limited to the conventional materials hitherto used for this purpose such as cellulose acetate films and acrylic films, but non-oriented or uniaxially stretched and oriented films of other materials such as fluoride type polymers (e.g. tetrafluoroethylene-hexafluoropropylene copolymer and the like), polyester resin, polyolefin resin, polyamide resin and the like can also be used.

BEST EMBODIMENT FOR THE PRACTICE OF THE INVENTION

Hereunder, the invention will be illustrated in more detail with reference to the following examples in no limitative way but only in an illustrative way.

As referred to in the invention, the term "polarizing co-efficient" means a value which has been determined by preparing two sheets of light-polarizing film or light-polarizing plate, superposing the two sheets or plates, and measuring/preparing its light transmittance curve with a SHIMAZU SEISAKUSHO Spectrophotometer Type UV-210, followed by calculation according to the following equation:

$$\text{Polarizing co-efficient} = \sqrt{\frac{H_{\parallel} - H_{\perp}}{H_{\parallel} + H_{\perp}}} \times 100 \, (\%)$$

wherein $H_{\parallel}$ is a transmittance measured by superposing two sample sheets so that the two polarized films have identical orientation (this is called "light transmittance in placing two identical polarizers in parallel") and $H_{\perp}$ is a transmittance measured by superposing the two sample sheets so that the two polarized films make a crossed orientation (this is called "light transmittance in placing two identical polarizers in cross axis").

EXAMPLE 1

A polyvinyl alcohol film having a thickness of 75μ (Kuraray-vinylon ® #7500) was stretched to 4 times its original length along the longitudinal axis to make a base material of polarizing film. While keeping the PVA film in a stretched state, it was dipped into a solution (dyeing bath A) composed of 0.6 g of Chrysophenine (C.I. Direct Yellow 12, manufactured by Sumitomo Chemical Co. Ltd.), 4.0 g of anhydrous sodium sulfate and 2,000 g of water at a temperature of 23° C. for a period of about 60 seconds, after which it was dipped into a solution (dyeing bath B) composed of 10 g of iodine, 150 g of potassium iodide and 3,300 g of water at a temperature of 23° C. for a period of about 30 seconds. Further, it was dipped into a solution composed of 150 g of boric acid and 2,000 g of water at a temperature of 65° C. for a period of about 200 seconds. Then, it was washed with water at 20° C. for 2 minutes to obtain a light-polarizing film. The light-polarizing film thus obtained assumed a neutral gray in the wavelength range of visible light (400 nm to 700 nm). In this wavelength range, its mean light-transmittance of single polarizer was 45% and its mean polarizing co-efficient was 96%.

COMPARATIVE EXAMPLE 1

A light-polarizing film was produced by repeating the procedure of Example 1, except that the dipping into dyeing bath A was omitted. In the wavelength range of visible light (400 nm to 700 nm), this polarizing film had a mean light-transmittance of single polarizer of 43% and a means polarizing co-efficient of 94%.

EXAMPLE 2

While keeping the same base material for light-polarizing film as in Example 1 in a stretched state, it was dipped into a solution (dyeing bath A) composed of 0.6 g of Chrysophenine (C.I. Direct Yellow 12, manufactured by Sumitomo Chemical Co. Ltd.), 1.2 g of Sumilight Supra Blue 3GS (C.I. Direct Blue 202, manufactured by Sumotomo Chemical Co. Ltd.), 10 g of anhydrous sodium sulfate and 2,000 g of water at a temperature of 23° C. for a period of about 60 seconds, after which it was dipped into a solution (dyeing bath B) composed of 10 g of iodine, 150 g of potassium iodide and 2,000 g of water at a temperature of 23° C. for a period of about 20 seconds, after which it was dipped into a solution composed of 150 g of boric acid and 2,000 g of water at a temperature of 65° C. for a period of about 200 seconds. Then, it was washed with water at 20° C. for 2 minutes to obtain a light-polarizing film. In the wavelength range of visible light (400 nm to 700 nm), the light-polarizing film thus obtained assumed a neutral gray and had a mean light transmittance of single polarizer of 47% and a mean polarizing co-efficient of 94%.

COMPARATIVE EXAMPLE 2

A light-polarizing film was produced by repeating the procedure of Example 2, except that the dipping into dyeing bath A was omitted. In the wavelength range of visible light (400 nm to 700 nm), the light-polarizing film thus obtained had a mean light-transmittance of single polarizer of 45% and a mean polarizing co-efficient of 90%.

EXAMPLE 3

While keeping the same base material of light-polarizing film as in Example 1 in a stretched state, it was dipped into a solution (dyeing bath A) composed of 1.2 g of Sumilight Supra Blue 3GS (C.I. Direct Blue 202, manufactured by Sumitomo Chemical Co. Ltd.), 7 g of anhydrous sodium sulfate and 2,000 g of water at a temperature of 23° C. for a period of about 60 seconds, after which it was dipped into a solution (dyeing bath B) composed of 10 g of iodine, 150 g of potassium iodide and 2,000 g of water at a temperature of 23° C. for a period of about 30 seconds, after which it was dipped into a solution composed of 150 g of boric acid and 2,000 g of water at a temperature of 65° C. for a period of about 200 seconds. Then, it was washed with water at 20° C. for 2 minutes to obtain a light-polarizing film. In the wavelength range of visible light (400 nm to 700 nm), the light-polarizing film thus obtained assumed a neutral gray and had a mean light-transmittance of single polarizer of 46% and a mean-polarizing co-efficient of 93%.

COMPARATIVE EXAMPLE 3

A light-polarizing film was produced by repeating the procedure of Example 3, except that the dipping into dyeing bath A was omitted. In the wavelength range of visible light (400 nm to 700 nm), the light-polarizing film thus obtained had a mean light transmittance of single polarizer of 45% and a mean polarizing co-efficient of 91%.

EXAMPLE 4

The light-polarizing films obtained in Example 1, Example 2 and Example 3 were dried at 100° C. for one hour and then a high density polyethylene film having a thickness of 80μ which had been stretched by the rolling process to 7 times the original length along the longitudinal axis was laminated to both sides of the light-polarizing films by the use of a urethane adhesive. The initial performances of the light-polarizing plates thus obtained were measured, and then the light-polarizing plates were allowed to stand in a constant temperature-constant humidity chamber having a temperature of 60° C. and a humidity of 90% RH for a period of 500 hours. Their polarizing performances after the standing were as shown in Table 1, where deterioration of performances is hardly noticeable as compared with the initial performances.

EXAMPLE 5

After the experiment of Example 4, the residual pieces of the light-polarizing plate samples, of which initial performances had already been measured, were allowed to stand in a drying oven at 80° C. for 500 hours. The performances after the standing were as shown in Table 1, where deterioration in performances is hardly noticeable as compared with the initial performances.

TABLE 1

| | When the light-polarizing film of Example 1 is used | | | | When the light-polarizing film of Example 2 is used | | | | When the light-polarizing film of Example 3 is used | | | |
|---|---|---|---|---|---|---|---|---|---|---|---|---|
| | Initial performance | | Post-test performances | | Initial performances | | Post-test performances | | Initial performances | | Post-test performances | |
| | A* | B* | A* | B* | A* | B* | A* | B* | A* | B* | A* | B* |
| Example 4 | 45% | 96% | 46% | 94% | 47% | 94% | 49% | 91% | 46% | 93% | 48% | 90% |
| Example 5 | 45% | 96% | 45% | 95% | 47% | 94% | 48% | 93% | 46% | 93% | 47% | 92% |

A*: Transmittance of single polarizer
B*: Polarizing co-efficient

INDUSTRIAL UTILIZABILITY

The high-performance light-polarizing films obtained in the above-mentioned manner are higher than the prior iodine type light-polarizing films in the mean light transmittance of single polarizer in the wavelength range of visible light (400 nm to 700 nm). Further, they have a neutral gray, shows no decrease in the polarizing co-efficient and have a high polarizing co-efficient. Accordingly, they are suitable for use as a liquid crystal display material in liquid crystal television and the like, as well as for use in various optical devices such as CRT filter and the like.

What is claimed is:

1. A light-polarizing film exhibiting a neutral gray produced by absorbing in and orienting at least one coloring matter selected from the group consisting of (1) (A) and (B), (2) (A) and (C), and (3) (A) and (B) and (C), as a dichroic coloring matter in a polymer film; wherein (A) is iodine, (B) is a dichroic dye having absorption characteristics and polarization characteristics in the wavelength region of 400~500 nm in the wavelength range of visible light, (C) is a dichroic dye having absorption characteristics and polarization characteristics in the wavelength region of 600~700 nm in the wavelength range of visible light, wherein a high density polyethylene film or polypropylene film which has been uniaxially stretched is laminated as a protective film onto at least one side of the light-polarizing film.

* * * * *